(12) United States Patent
Umeda et al.

(10) Patent No.: US 10,686,514 B2
(45) Date of Patent: Jun. 16, 2020

(54) WIRELESS RECEIVING DEVICE AND DESIRED SIGNAL DETECTION METHOD

(71) Applicant: Mitsubishi Electric Corporation, Tokyo (JP)

(72) Inventors: Shusaku Umeda, Tokyo (JP); Kazumasa Suzuki, Tokyo (JP); Hiroyasu Sano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/317,183

(22) PCT Filed: Sep. 15, 2016

(86) PCT No.: PCT/JP2016/077238
§ 371 (c)(1),
(2) Date: Jan. 11, 2019

(87) PCT Pub. No.: WO2018/051454
PCT Pub. Date: Mar. 22, 2018

(65) Prior Publication Data
US 2019/0229797 A1 Jul. 25, 2019

(51) Int. Cl.
*H04B 7/08* (2006.01)
*H04B 7/10* (2017.01)
(Continued)

(52) U.S. Cl.
CPC .......... *H04B 7/086* (2013.01); *H04B 7/0456* (2013.01); *H04B 7/0634* (2013.01); *H04B 7/10* (2013.01); *H04J 11/0023* (2013.01)

(58) Field of Classification Search
CPC ........ H04B 7/086; H04B 7/10; H04B 7/0634; H04B 7/0456; H04J 11/0023
See application file for complete search history.

(56) References Cited

U.S. PATENT DOCUMENTS 8,005,238 B2 * 8/2011 Tashev ...................... G01S 3/86
367/118
8,325,862 B2 * 12/2012 Kusano ................ H04B 7/0865
375/148

(Continued)

FOREIGN PATENT DOCUMENTS

JP 3439724 B2 8/2003
JP 5175718 B2 4/2013

*Primary Examiner* — Jean B Corrielus
(74) *Attorney, Agent, or Firm* — Birch, Stewart, Kolasch & Birch, LLP

(57) ABSTRACT

A wireless receiving device includes a signal measurement unit; a weighting factor generation unit that generates weighting factors each for suppression of the received signals, based on measurement results of the received signals; interference suppression units that each perform, in a parallel manner, interference suppression processing on the received signals, using, one of the weighting factors; arrival detection units that are connected in one-to-one to the interference suppression units, the arrival detection units each detecting arrival of a desired signal; an arrival determination unit that determines whether the desired signal has arrived; and a demodulation processing unit that demodulates the received signals when the arrival determination unit determines that the desired signal has arrived.

11 Claims, 15 Drawing Sheets

(51) Int. Cl.
*H04J 11/00* (2006.01)
*H04B 7/0456* (2017.01)
*H04B 7/06* (2006.01)

(56) References Cited

U.S. PATENT DOCUMENTS

2009/0135972 A1 5/2009 Tanaka et al.
2009/0147893 A1 6/2009 Takahashi et al.
2013/0034195 A1 2/2013 Takahashi et al.

* cited by examiner

WIRELESS RECEIVING DEVICE AND DESIRED SIGNAL DETECTION METHOD

FIELD

The present invention relates to a wireless receiving device for detecting a desired signal, and to a desired signal detection method.

BACKGROUND

In an environment where multiple wireless devices share a certain frequency band to communicate with each other, a wireless device that receives data, i.e., a wireless receiving device, may receive not only a desired signal, which is a signal transmitted from a wireless transmission device in the system currently involved in the communication, but also a signal transmitted from a wireless transmission device of another system unrelated to the system currently involved in the communication. A signal transmitted from a wireless transmission device of another system acts as an interference signal for the wireless receiving device, and a wireless transmission device of another system thus acts as an interference source. Patent Literatures 1 and 2 each disclose a technology that allows a wireless receiving device to identify a wireless transmission device that acts as an interference source, and to suppress an interference signal transmitted from a wireless transmission device that acts as an interference source to receive a desired signal.

CITATION LIST

Patent Literature

Patent Literature 1: Japanese Patent No. 5175718
Patent Literature 2: Japanese Patent No. 3439724

SUMMARY

Technical Problem

However, the foregoing conventional technologies may fail to allow the wireless receiving device to detect arrival of a desired signal if received power of the desired signal is significantly lower than received power of the interference signal. This presents a problem of failure of the wireless receiving device to receive the desired signal, thereby resulting in degradation in communication quality.

The present invention has been made in view of the foregoing, and it is an object of the present invention to provide a wireless receiving device that detects arrival of a desired signal in an environment in which multiple wireless transmission devices can each transmit a signal.

Solution to Problem

To solve the problem and achieve the object described above, a wireless receiving device of the present invention comprises: a signal measurement unit to measure received signals, the received signals being signals received by a plurality of reception antennas; and a weighting factor generation unit to generate weighting factors each for suppression of the received signals, on a basis of measurement results of the received signals, the measurement results being provided by the signal measurement unit. The wireless receiving device also comprises: a plurality of interference suppression units to each perform, in a parallel manner, interference suppression processing on the received signals, using one of the weighting factors, the one weighting factor used by one of the interference suppression units being different from weighting factors used by other interference suppression units, the weighting factors being generated by the weighting factor generation unit at different points of time; and a plurality of arrival detection units connected one-to-one to the plurality of interference suppression units, each of the arrival detection units detecting arrival of a desired signal using received signals that have been subjected to the interference suppression processing in the corresponding interference suppression unit connected thereto. The wireless receiving device further comprises: an arrival determination unit to determine whether the desired signal has arrived, on the basis of detection results provided by the plurality of arrival detection units; and a demodulation processing unit to demodulate the received signals received by the plurality of reception antennas, when the arrival determination unit determines that the desired signal has arrived.

Advantageous Effects of Invention

A wireless receiving device according to the present invention provides an advantage in being capable of detecting arrival of a desired signal in an environment where multiple wireless transmission devices can each transmit a signal.

DESCRIPTION OF EMBODIMENTS

A wireless receiving device and a desired signal detection method according to embodiments of the present invention will be described in detail below with reference to the drawings. Note that these embodiments are not intended to limit the scope of this invention.

First Embodiment

Figure 1:
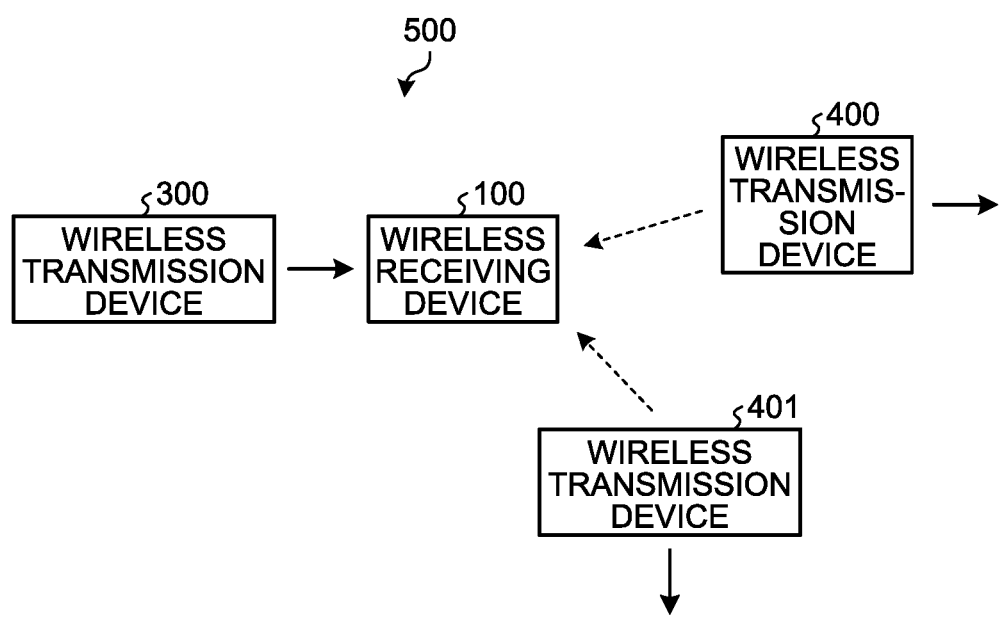
FIG. 1 is a diagram illustrating an example configuration of a wireless communication system including a wireless receiving device according to a first embodiment.

FIG. 1 is a diagram illustrating an example configuration of a wireless communication system 500 including a wireless receiving device 100 according to a first embodiment of the present invention. In the wireless communication system 500, the wireless receiving device 100 and wireless transmission devices 300, 400, and 401 share a same frequency band. In the wireless communication system 500, the wireless transmission device 300 transmits a desired signal to the wireless receiving device 100, and the wireless transmission devices 400 and 401 each transmit a desired signal to a wireless receiving device not illustrated. In this situation, the signals transmitted by the wireless transmission devices 400 and 401 act as interference signals from the standpoint of the wireless receiving device 100. FIG. 1 illustrates a desired signal by a solid arrow, and an interference signal by a dotted arrow. This embodiment provides a situation of the wireless communication system 500 where the wireless receiving device 100 may receive a desired signal from the wireless transmission device 300, and interference signals from the wireless transmission devices 400 and 401, concurrently. This situation also applies to the later embodiments.

Figure 2:
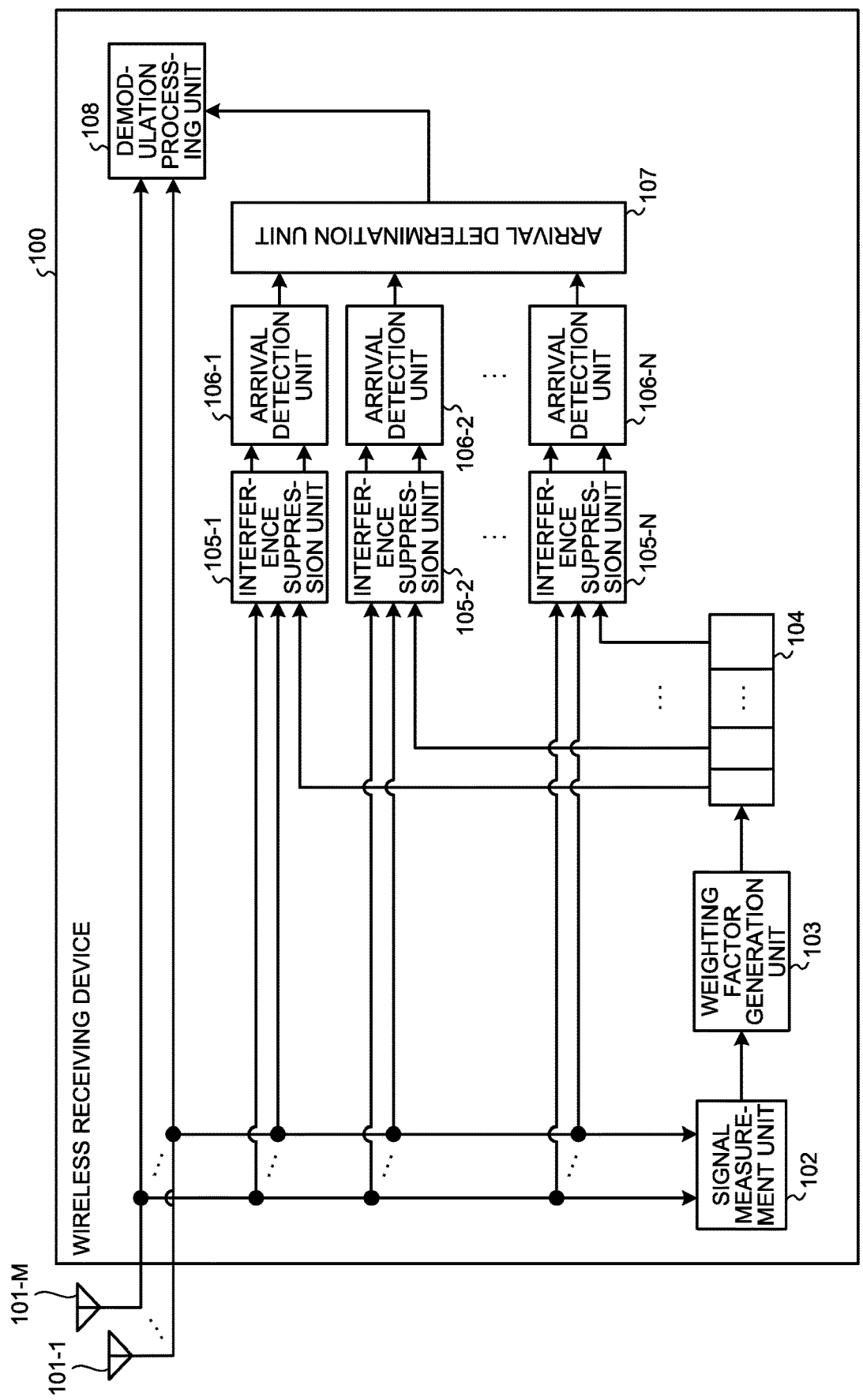
FIG. 2 is a block diagram illustrating an example configuration of the wireless receiving device according to the first embodiment.

A configuration of the wireless receiving device 100 will next be described. FIG. 2 is a block diagram illustrating an example configuration of the wireless receiving device 100 according to the first embodiment. Note that FIG. 2 illustrates only the necessary components for the description of the first embodiment, and omits general components. The wireless receiving device 100 includes reception antennas 101-1 to 101-M, a signal measurement unit 102, a weighting factor generation unit 103, a ring buffer 104, interference suppression units 105-1 to 105-N, arrival detection units 106-1 to 106-N, an arrival determination unit 107, and a demodulation processing unit 108, where M and N are each a natural number, and either M or N may be greater. Although FIG. 2 illustrates the reception antennas 101-1 to 101-M as being provided outside the wireless receiving device 100, the wireless receiving device 100 is regarded as including the reception antennas 101-1 to 101-M. This definition also applies to the later embodiments.

Where appropriate, the reception antennas 101-1 to 101-M should be hereinafter referred to as "reception antenna 101" if the reception antennas need not be individually referred to. Similarly, the interference suppression units 105-1 to 105-N should be hereinafter referred to as "interference suppression unit 105" if the interference suppression units need not be individually referred to. Further, the arrival detection units 106-1 to 106-N may be hereinafter referred to as "arrival detection unit 106" if the arrival detection units need not be individually referred to.

The reception antennas 101-1 to 101-M each receive a desired signal transmitted from the wireless transmission device 300 configured to transmit a desired signal to the wireless receiving device 100. In addition to the desired signal, each of the reception antennas 101-1 to 101-M receives interference signals transmitted from the wireless transmission devices 400 and 401, which herein act as interference sources. Received signals received by the reception antennas 101-1 to 101-M include the desired signal transmitted from the wireless transmission device 300 and the interference signals transmitted from the wireless transmission devices 400 and 401.

The signal measurement unit 102 measures the received signals received by the reception antennas 101-1 to 101-M. For example, the signal measurement unit 102 measures a characteristic value of each of the received signals received by the reception antennas 101-1 to 101-M. As used herein, a characteristic value is a value similar to the characteristic value described in Patent Literature 1 listed above.

From the characteristic value of each of the received signals that is the measurement result provided by the signal measurement unit 102, the weighting factor generation unit 103 calculates a correlation value for each of the characteristic values. The weighting factor generation unit 103 then generates weighting factors each used for suppression of the received signals received by the reception antennas 101-1 to 101-M. The correlation values may be calculated by the signal measurement unit 102, and then be sent to the weighting factor generation unit 103.

The ring buffer 104 sequentially stores the weighting factors generated by the weighting factor generation unit 103. The ring buffer 104 stores weighting factors that are N in number, where N is identical to the number of symbols of the preamble signals contained in the desired signal described later herein.

Each of the interference suppression units 105-1 to 105-N uses one of the plural weighting factors, stored in the ring buffer 104, to thereby perform interference suppression processing on the received signals received by the reception antennas 101-1 to and 101-M. The weighting factor used by one of the interference suppression units is different from the weighting factors used by the other interference suppression units 105. All of the interference suppression units 105-1 to 105-N parallelly perform the interference suppression processing.

The arrival detection units 106-1 to 106-N are connected one-to-one to the interference suppression units 105-1 to 105-N such that the arrival detection unit detects arrival of a desired signal from the wireless transmission device 300 by using the received signals that have been subjected to the interference suppression processing in the corresponding interference suppression unit 105 connected thereto.

The arrival determination unit 107 determines whether the desired signal has arrived from the wireless transmission device 300 on the basis of detection results from the arrival detection units 106-1 to 106-N.

If the arrival determination unit 107 determines that the desired signal has arrived from the wireless transmission device 300, the demodulation processing unit 108 demodulates the received signals received by the reception antennas 101-1 to 101-M.

Figure 3:
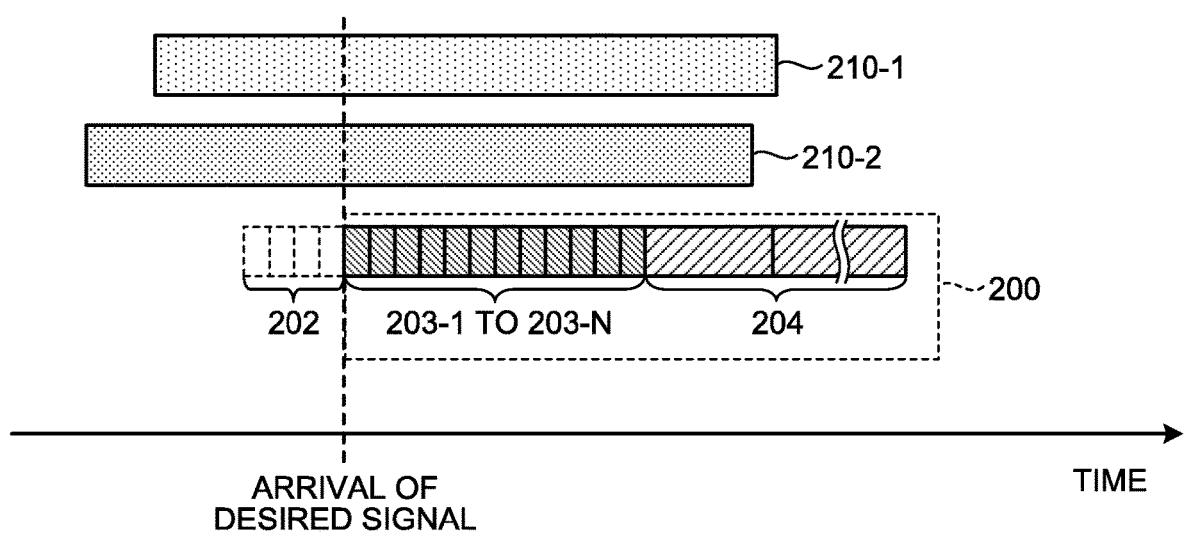
FIG. 3 is a diagram illustrating an example situation where the wireless receiving device according to the first embodiment receives a desired signal and interference signals.

FIG. 3 is a diagram illustrating an example situation where the wireless receiving device 100 according to the first embodiment receives a desired signal 200 and interference signals 210-1 and 210-2. As illustrated in FIG. 3, the desired signal 200 is made up of N preamble signals 203-1 to 203-N known to the wireless receiving device 100, and a data signal 204. The N preamble signals 203-1 to 203-N are used by the wireless receiving device 100 to detect arrival of the desired signal 200. In the first embodiment, the desired signal 200 arrives at the wireless receiving device 100 along a single route. A period of time before the preamble signal 203-1 includes a no-signal period 202 containing no signals from the wireless transmission device 300. In the example of FIG. 3, the interference signals 210-1 and 210-2 are illustrated as also arriving at the wireless receiving device 100 concurrently with the desired signal 200.

In this situation, the wireless receiving device 100 can observe signals other than the desired signal 200, i.e., the interference signals 210-1 and 210-2, during the no-signal period 202. From the characteristic values measured by the signal measurement unit 102 in the no-signal period 202, the weighting factor generation unit 103 of the wireless receiving device 100 generates weighting factors for suppressing interference caused by all the signals other than the desired signal 200, i.e., by the interference signals 210-1 and 210-2. During the period of reception of the preamble signals 203-1 to 203-N, any of the interference suppression units 105-1 to 105-N of the wireless receiving device 100 uses a weighting factor generated by the weighting factor generation unit 103, thereby performing interference suppression processing. This enables any of the arrival detection units 106-1 to 106-N of the wireless receiving device 100 to detect the preamble signals 203-1 to 203-N having experienced less interference by the interference signals 210-1 and 210-2. As a result, the wireless receiving device 100 can detect arrival of the desired signal 200.

However, the wireless receiving device 100 does not know when the desired signal 200 will arrive from the wireless transmission device 300. Thus, the wireless receiving device 100 parallelly performs the interference suppression processing on the received signals and detects the arrival of the desired signal, over periods of time shifted from one another.

Figure 4:
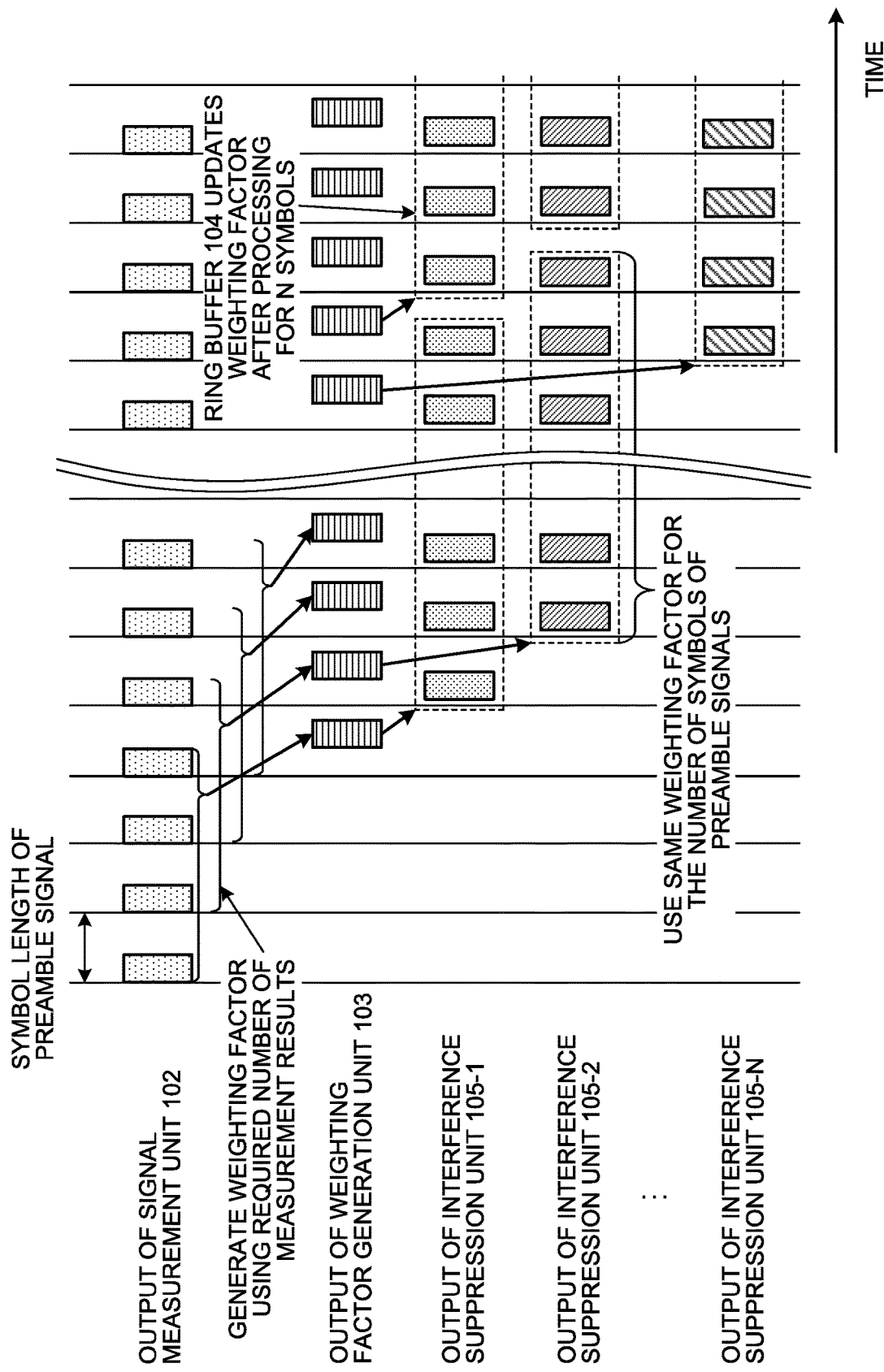
FIG. 4 is a timing chart illustrating a process flow from characteristic value measurement to interference suppression processing performed in the wireless receiving device according to the first embodiment.

FIG. 4 is a timing chart illustrating a process flow from the characteristic value measurement to the interference suppression processing in the wireless receiving device 100 according to the first embodiment. As illustrated in FIG. 4, firstly, the signal measurement unit 102 of the wireless receiving device 100 measures characteristic values of the received signals, the characteristic values being necessary for generating a weighting factor. The characteristic values are measured at time intervals each amounting to the time during which one symbol of the preamble signals is received. Each time the signal measurement unit 102 outputs a measurement result, i.e., a characteristic value, the weighting factor generation unit 103 uses the latest measurement result and at least one previous measurement result to thereby generate a weighting factor for suppressing the received signals from which these measurement results have been obtained. The number of required measurement results illustrated in FIG. 4 is one or more. A larger number of the measurement results can more reduce an effect of unexpected noise or the like, but an excessively large number of the measurement results may contain a measurement result of the data signal 204 of a previously-received desired signal 200 (not illustrated). Therefore, the required number suitable for the operational conditions of the wireless communication system 500 can be determined by, for example, the administrator of the wireless communication system 500.

The interference suppression units 105-1 to 105-N each use one of the weighting factors generated by the weighting factor generation unit 103 at different points of time, such that the interference suppression unit uses the same weighting factor to thereby perform interference suppression processing for a duration amounting to N symbols, where N is the number of symbols of the preamble signals 203-1 to 203-N. After the one weighting factor of the weighting factors generated by the weighting factor generation unit 103 at different points of time is used for the duration amounting to N symbols, the interference suppression units 105-1 to 105-N each read an updated weighting factor stored in the same location of the ring buffer 104 as the location where the previously-used weighting factor was stored. The interference suppression unit then performs interference suppression processing, using that updated weighting factor for a duration amounting to N symbols. One of the interference suppression units 105-1 to 105-N changes the weighting factor to use, at every time interval during which one symbol of the preamble signals 203-1 to 203-N is received. The one interference suppression unit 105 then uses the changed weighting factor to thereby perform interference suppression processing on the received signals for a duration amounting to N symbols.

In this example, the ring buffer 104 is configured to store up to N weighting factors. The ring buffer 104 overwrites the first buffer, that is, updates the weighting factor, with an (N+1)th weighting factor generated by the weighting factor generation unit 103. The ring buffer 104 updates the weighting factor at a cycle or time interval equivalent to the N symbols during which an interference suppression unit 105 performs the interference suppression processing on the received signals. That is, once a certain interference suppression unit 105 completes the interference suppression processing on the received signals for the duration amounting to N symbols, the ring buffer 104 updates the weighting factor in the location where that interference suppression unit 105 have read the weighting factor. In the wireless receiving device 100, a one-to-one correspondence between the weighting factors used by the interference suppression units 105-1 to 105-N and the weighting factors in the ring buffer 104 causes the period of update of a weighting factor, i.e., the number of weighting factors, in the ring buffer 104 to match the number of symbols of the preamble signals 203-1 to 203-N. Thus, the interference suppression units 105-1 to 105-N and in the arrival detection units 106-1 to 106-N perform the processing, over different periods of time shifted by one symbol from one another. As a result, the wireless receiving device 100 is unlikely to miss or overlook arrival of the desired signal 200, but fully detects the arrival of the desired signal 200 regardless of when the desired signal 200 arrives.

In the wireless receiving device 100, at a time when one of the interference suppression units 105 has performed interference suppression processing on all of the symbols of the preamble signals 203-1 to 203-N of the desired signal 200, the arrival detection unit 106 connected to the interference suppression unit 105 that has performed the interference suppression processing on the preamble signals 203-1 to 203-N of the desired signal 200 detects arrival of the desired signal 200. The wireless receiving device 100, which is capable of detecting arrival of the desired signal 200 upon reception of the preamble signals 203-1 to 203-N, can demodulate the data signal 204 that has been received following the preamble signals 203-1 to 203-N.

For some structure of the preamble signals 203-1 to 203-N, at a time one of the interference suppression units 105 of the wireless receiving device 100 has performed interference suppression processing on the preamble signals 203-1 to 203-(N–α) of the desired signal 200, the arrival detection unit 106 connected to the interference suppression unit 105 that has performed the interference suppression processing on the preamble signals 203-1 to 203-(N–α) of the desired signal 200 can detect that the desired signal 200 will arrive after a symbols. It is to be noted that α is a natural number less than N.

As described above, the wireless receiving device 100 is configured such that the interference suppression units 105-1 to 105-N each use the same weighting factor to perform interference suppression processing on the received signals having the symbols equal in number to the symbols of the known preamble signals 203-1 to 203-N contained in the desired signal 200. That is, among the interference suppression units 105-1 to 105-N, the interference suppression unit 105, which uses a weighting factor based on the result of measurement of the received signals in the no-signal period 202 prior to the arrival of the desired signal 200, performs the interference suppression processing on all of the symbols of the preamble signals 203-1 to 203-N.

In addition, the interference suppression units 105-1 to 105-N individually perform interference suppression processing parallelly on the received signals amounting to the number of symbols of the preamble signals 203-1 to 203-N, over different ranges of the interference suppression processing that are shifted from one another by one symbol length of the preamble signals 203-1 to 203-N. Among the arrival detection units 106-1 to 106-N, the arrival detection unit 106 connected to the interference suppression unit 105 that has performed the interference suppression processing on all of the symbols of the preamble signals 203-1 to 203-N detects arrival of the desired signal 200. This enables the wireless receiving device 100 to detect the arrival of the desired signal 200 without failing to detect the arrival, regardless of when the preamble signals 203-1 to 203-N of the desired signal 200 arrive.

Figure 5:
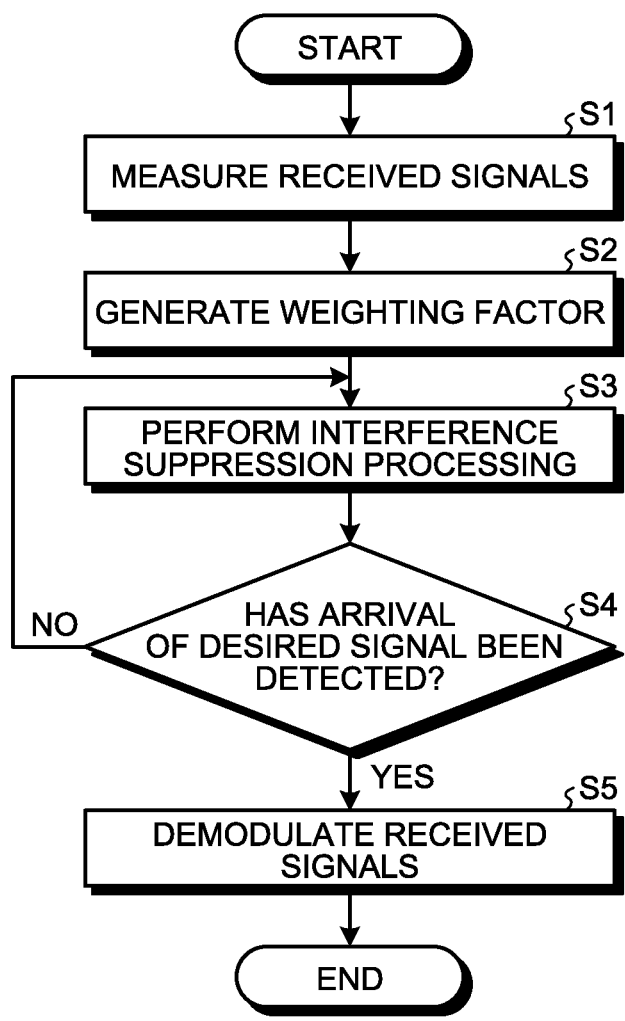
FIG. 5 is a flowchart illustrating a process of detection of arrival of a desired signal performed in the wireless receiving device according to the first embodiment.

FIG. 5 is a flowchart illustrating a process of detection of arrival of the desired signal 200 in the wireless receiving device 100 according to the first embodiment. At the beginning, in the wireless receiving device 100, the signal measurement unit 102 measures the received signals, more specifically, characteristic values of the respective received signals, received by the reception antennas 101-1 to 101-M (step S1).

The weighting factor generation unit 103 generates a weighting factor, using the characteristic values measured by the signal measurement unit 102 (step S2). The weighting factor generation unit 103 stores the generated weighting factor in the ring buffer 104. The interference suppression units 105-1 to 105-N each perform interference suppression processing on the received signals, using the weighting factor stored in the ring buffer 104 (step S3). The arrival detection units 106-1 to 106-N attempt to detect arrival of a desired signal, using the received signals that have been subjected to the interference suppression processing in the interference suppression units 105-1 to 105-N (step S4).

If arrival of a desired signal is not detected by the arrival detection units 106-1 to 106-N (step S4: No), the interference suppression units 105-1 to 105-N continue to perform interference suppression processing (step S3). If one arrival detection unit 106 of the arrival detection units 106-1 to 106-N detects arrival of a desired signal (step S4: Yes), the arrival detection unit 106 that has detected the arrival of a desired signal informs the arrival determination unit 107 of detection of the arrival of a desired signal. The arrival determination unit 107 informs the demodulation processing unit 108 of the arrival of the desired signal. Then, the demodulation processing unit 108 demodulates the received signals received by the reception antennas 101-1 to 101-M (step S5).

A hardware configuration of the wireless receiving device 100 will next be described. In the wireless receiving device 100, the reception antennas 101-1 to 101-M are implemented by standard general-purpose antenna elements. The demodulation processing unit 108 is implemented by a demodulator circuit. In the wireless receiving device 100, the signal measurement unit 102, the weighting factor generation unit 103, the ring buffer 104, the interference suppression units 105-1 to 105-N, the arrival detection units 106-1 to 106-N, and the arrival determination unit 107 are implemented by a processing circuit. That is, the wireless receiving device 100 includes a processing circuit for measuring characteristic values of respective received signals, generating weighting factors, parallelly performing interference suppression processing on the received signals using the weighting factors, and detecting arrival of a desired signal. The processing circuit may be a combination of a central processing unit (CPU) that executes a program stored in a memory and the memory, or may be a dedicated hardware element.

Figure 6:
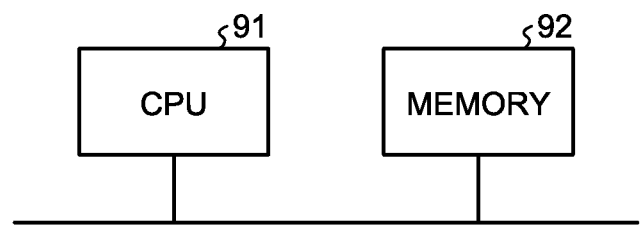
FIG. 6 is a diagram illustrating a processing circuit of the wireless receiving device according to the first embodiment in a case in which the processing circuit is made up of a CPU and a memory.

FIG. 6 is a diagram illustrating a processing circuit of the wireless receiving device 100 according to the first embodiment in a case in which the processing circuit is made up of a CPU and a memory. In a case in which the processing circuit is made up of a CPU 91 and a memory 92, the functions of the processing circuit of the wireless receiving device 100 are implemented by software, firmware, or a combination of software and firmware. The software and/or firmware is written in a form of program, and stored in the memory 92. The processing circuit provides functions implemented by the CPU 91 reading and executing a program stored in the memory 92. That is, the processing circuit in the wireless receiving device 100 includes the memory 92 for storing programs to perform a step of measuring characteristic values of respective received signals, a step of generating weighting factors, a step of parallelly performing interference suppression processing on the received signals using the weighting factors, and a step of detecting arrival of a desired signal. In other words, these programs cause a computer to perform the procedure and method of the wireless receiving device 100. In this example, the CPU 91 may also be a processing device, a computing unit, a microprocessor, a microcomputer, a processor, a digital signal processor (DSP), or the like. The memory 92 may be, for example, a non-volatile or volatile semiconductor memory, such as a random access memory (RAM), a read-only memory (ROM), a flash memory, an erasable programmable ROM (EPROM), an electrically EPROM (EEPROM); a magnetic disk, a flexible disk, an optical disk, a compact disc, a MiniDisc, a digital versatile disc (DVD), or the like.

Figure 7:
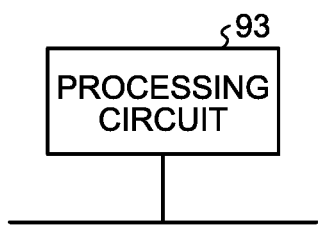
FIG. 7 is a diagram illustrating an operation circuit of the wireless receiving device according to the first embodiment in a case in which the operation circuit is made up of a dedicated hardware element.

FIG. 7 is a diagram illustrating an operation circuit of the wireless receiving device 100 according to the first embodiment in a case in which the operation circuit is made up of a dedicated hardware element. In a case in which the processing circuit is a dedicated hardware element, the processing circuit 93 illustrated in FIG. 7 is, for example, a single circuit, a set of multiple circuits, a programmed processor, a set of multiple programmed processors, an application specific integrated circuit (ASIC), a field programmable gate array (FPGA), or a combination thereof. The functions of the wireless receiving device 100 may be implemented in the processing circuit 93 individually in a function specific manner, or be implemented in the processing circuit 93 collectively as a whole.

The functions of the wireless receiving device 100 may be implemented partly in a dedicated hardware element, and partly in software or firmware. Thus, the processing circuit can provide the functions described above by a dedicated hardware element, software, firmware, or a combination thereof.

As described above, according to the present embodiment, the wireless receiving device 100 is configured such that the N interference suppression units 105-1 to 105-N parallelly perform interference suppression processing, using weighting factors generated at different points of time, and the N arrival detection units 106-1 to 106-N parallelly detect arrival of a desired signal using the received signals that have been subjected to the interference suppression processing performed using different weighting factors, where N is the number of symbols of the preamble signals. That is, the wireless receiving device 100 continuously maintains the relationship with the preamble signals such that the wireless receiving device 100 performs interference suppression processing on all of the preamble signals, using a weighting factor based on results of measurement obtained during the no-signal period containing no desired signals. Thus, by performing interference suppression processing on the preamble signals, the wireless receiving device 100 can detect arrival of a desired signal with higher accuracy.

Second Embodiment

For the wireless receiving device 100 of the first embodiment, the desired signal 200 arrives at the wireless receiving device 100 along a single route. A second embodiment will be described on the assumption that there are plural routes along which desired signals arrives at a wireless receiving device. The second embodiment differs from the first embodiment in the respects as will be described below.

Figure 8:
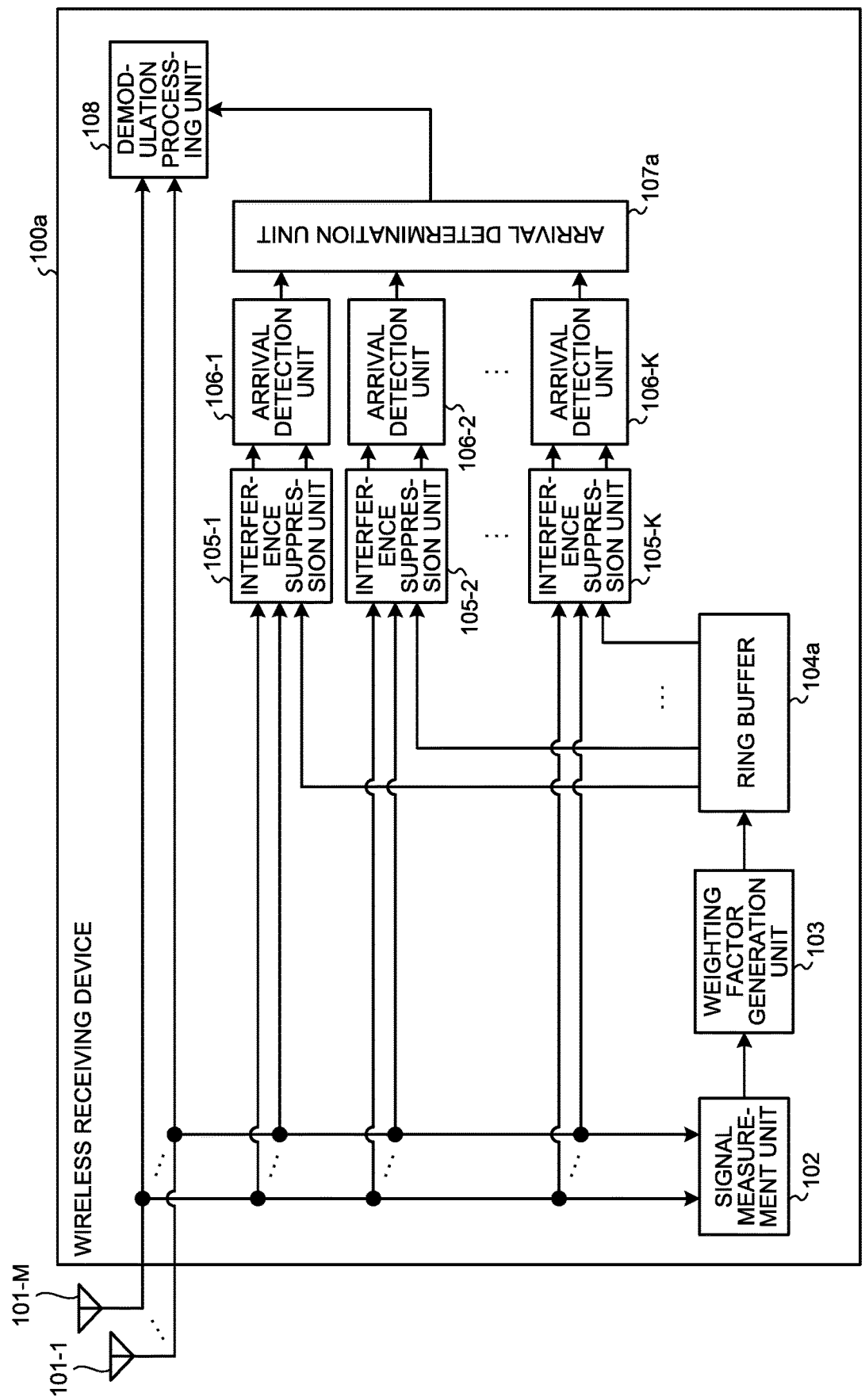
FIG. 8 is a block diagram illustrating an example configuration of a wireless receiving device according to a second embodiment.

FIG. 8 is a block diagram illustrating an example configuration of a wireless receiving device 100a according to the second embodiment. Note that FIG. 8 illustrates only the necessary components for the description of the second embodiment, and omits general components. As compared to the wireless receiving device 100, the wireless receiving device 100a is configured such that the ring buffer 104 and the arrival determination unit 107 are replaced with a ring buffer 104a and an arrival determination unit 107a, respectively, and interference suppression units 105-(N+1) to 105-K and arrival detection units 106-(N+1) to 106-K are added, where K is a natural number greater than N, and either M or K may be greater.

The interference suppression units 105-(N+1) to 105-K each operate similarly to the interference suppression unit 105-1 described above and the like. The arrival detection unit 106-(N+1) to 106-K each operate similarly to the arrival detection unit 106-1 described above and the like. The ring buffer 104a stores K weighting factors. The arrival determination unit 107a is connectable to the K arrival detection units 106-1 to 106-K. That is, the wireless receiving device 100a includes additional K-N parallel components as compared to the wireless receiving device 100, such that the K components parallelly perform the interference suppression processing on the received signals and the processing for detecting arrival of the desired signals.

Figure 9:
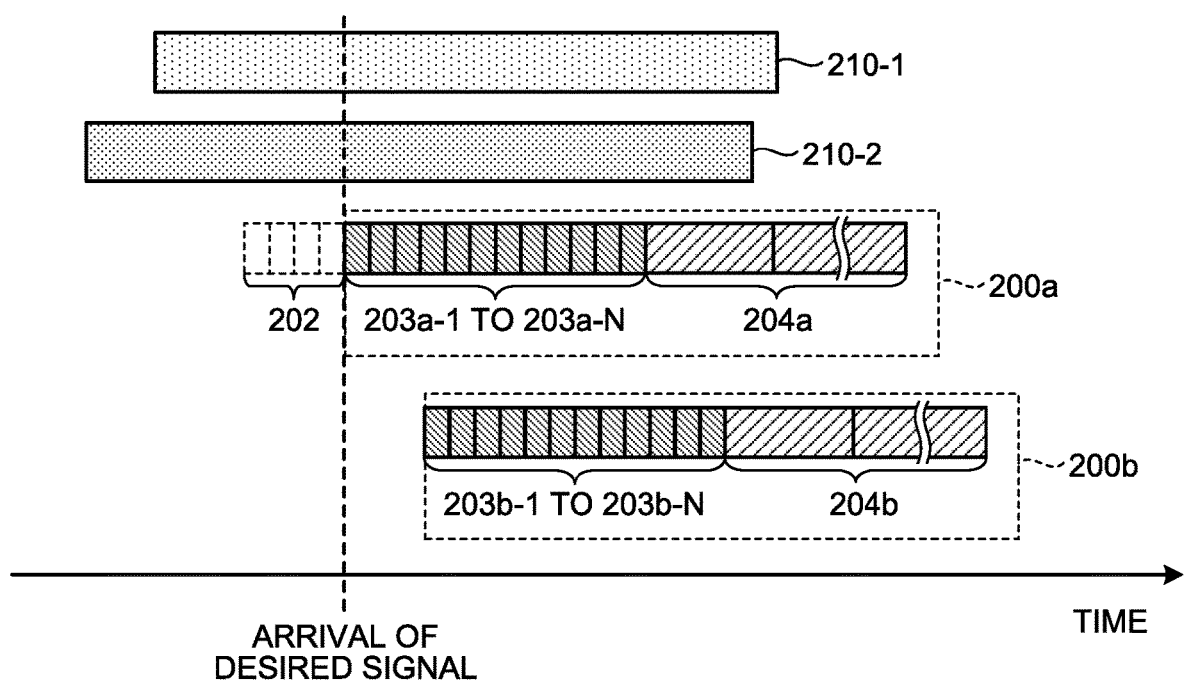
FIG. 9 is a diagram illustrating an example situation where the wireless receiving device according to the second embodiment receives a desired signal and interference signals.

FIG. 9 is a diagram illustrating an example situation where the wireless receiving device 100a according to the second embodiment receives desired signals 200a and 200b and the interference signals 210-1 and 210-2. Although the situation of the interference signals 210-1 and 210-2 in the second embodiment is similar to that of the first embodiment, the second embodiment is based on the assumption that there are two routes along which desired signals arrive at the wireless receiving device. In the example of FIG. 9, there are the two routes along which the desired signals 200a and 200b arrive at the wireless receiving device 100a.

For the plural routes, the longer the route is, the longer the delay in arrival of the desired signal at the wireless receiving device 100a is. In the example of FIG. 9, the desired signal 200b arrives at the wireless receiving device 100a later than the desired signal 200a. However, the power of the arrived desired signal is not necessarily proportionate to the length of the arriving route. Rather, in some case, the received power of the desired signal 200b arriving later is greater than the received power of the desired signal 200a, such that the desired signal 200b can be detected well. Therefore, as illustrated in FIG. 8, the K interference suppression units parallelly perform the interference suppression processing on the received signals and the K arrival detection units parallelly detect arrival of desired signals, where K is greater than N that is the number of symbols of the preamble signals. For even the later arriving desired signal 200b, as a result, the wireless receiving device 100a can use a weighting factor based on the characteristic values of the received signals in the no-signal period 202. Although the example of FIG. 9 is based on the assumption that there are the two routes along which the desired signals arrive at the wireless receiving device 100a, this configuration is merely by way of example, and a similar advantage is also provided for cases of three or more routes along which the desired signals arrive at the wireless receiving device.

The wireless receiving device 100a detects arrival of the desired signals 200a and 200b using a process similar to the flowchart of the first embodiment illustrated in FIG. 5.

The wireless receiving device 100a is implemented using hardware elements similar to the hardware elements of the first embodiment illustrated in FIG. 6 or 7.

As described above, according to the wireless receiving device 100a of the present embodiment, the number of the interference suppression processing performed parallelly by the interference suppression units 105 and the number of the processing performed parallelly by the arrival detection units 106 for detecting the arrival of the desired signals are greater than the number of symbols of the preamble signals. This enables the wireless receiving device 100a to detect arrival of even a desired signal arriving later, thereby achieving higher accuracy of detection of arrival of a desired signal than the wireless receiving device 100 of the first embodiment achieves.

Third Embodiment

In the first and second embodiments, the situation where the wireless receiving device receives the interference signals 210-1 and 210-2 both during the no-signal period 202 prior to the reception of the desired signal and during the period of reception of the preamble signals of the desired signal remains unchanged. A third embodiment will be described on the assumption that the reception status of the interference signals changes both during the no-signal period 202 prior to the reception of the desired signal and during the period of reception of the preamble signals of the desired signal. The third embodiment differs from the second embodiment in the respects as will be described below.

Figure 10:
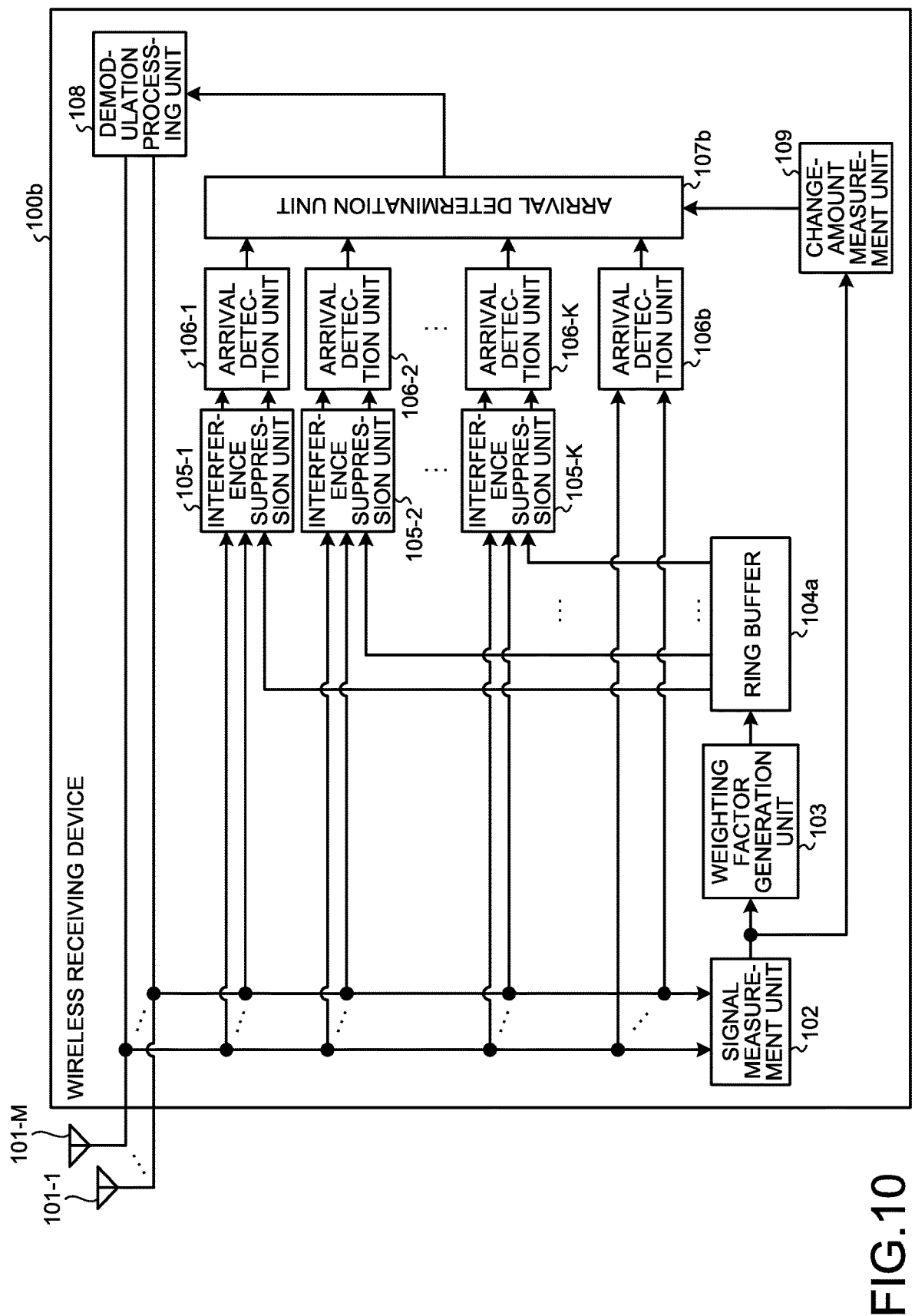
FIG. 10 is a block diagram illustrating an example configuration of a wireless receiving device according to a third embodiment.

FIG. 10 is a block diagram illustrating an example configuration of a wireless receiving device 100b according to the third embodiment. Note that FIG. 10 illustrates only the necessary components for the description of the third embodiment, and omits general components. As compared to the wireless receiving device 100a, the wireless receiving device 100b is configured such that the arrival determination unit 107a is replaced with an arrival determination unit 107b, and an arrival detection unit 106b and a change-amount measurement unit 109 are added.

The arrival detection unit 106b is connected to none of the interference suppression units 105-1 to 105-K. The arrival detection unit 106b detects arrival of a desired signal, using received signals received by the reception antenna 101-1 to 101-M and not subjected to interference suppression processing. The arrival detection unit 106b operates similarly to the arrival detection unit 106-1 described above and the like. As used herein, the arrival detection units 106-1 to 106-K are collectively referred to as "first arrival detection units" and the arrival detection unit 106b is referred to as "second arrival detection unit".

The change-amount measurement unit 109 measures an amount of change in each of the measurement results, i.e., the characteristic values measured by the signal measurement unit 102. Specifically, the change-amount measurement unit 109 converts each of the characteristic values output from the signal measurement unit 102 into a value of received power, and measures the amount of change in the received power. On the basis of the measured amount of change, the change-amount measurement unit 109 determines whether a change has occurred in the reception status of the received signals in the wireless receiving device 100b.

The arrival determination unit 107b is connectable to the K+1 arrival detection units 106-1 to 106-K and 106b, and determines whether the arrival detection units 106-1 to 106-K and 106b have detected the arrival of a desired signal. On the basis of the determination made by the change-amount measurement unit 109, the arrival determination unit 107b then determines to use either the detection results from the arrival detection units 106-1 to 106-K or the detection result from the arrival detection unit 106b. That is, on the basis of the determination made by the change-amount measurement unit 109, the arrival determination unit 107b determines the arrival detection unit 106 for use in determining the arrival of the desired signal.

Figure 11:
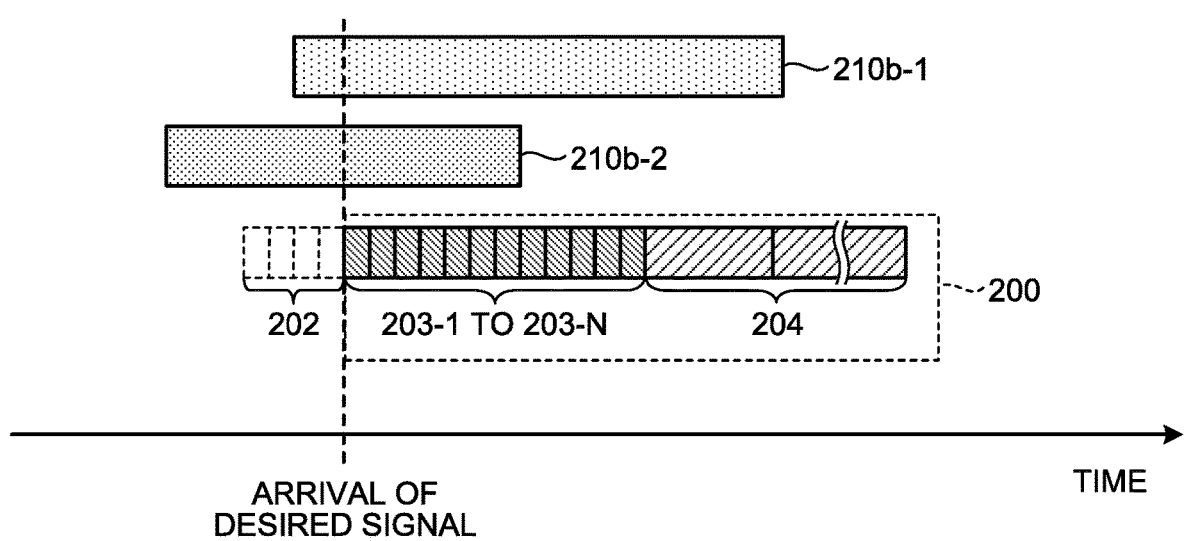
FIG. 11 is a diagram illustrating an example situation where on the wireless receiving device according to the third embodiment receives a desired signal and interference signals.

FIG. 11 is a diagram illustrating an example situation where the wireless receiving device 100b according to the third embodiment receives the desired signal 200 and the interference signals 210b-1 and 210b-2. Unlike the first and second embodiments, the third embodiment provides a situation where: the interference signal 210b-1 may arrive while the wireless receiving device 100b measures interference in the no-signal period 202; and the interference signal 210b-2 may disappear or end during detection of arrival of the preamble signals 203-1 to 203-N of the desired signal 200. Although in FIG. 11 there is a single route along which the desired signal 200 arrives at the wireless receiving device, this configuration is merely by way of example, and a similar advantage is also provided in a case where a desired signal arrives along two or more arriving routes as in the second embodiment.

When the wireless receiving device 100 described in the first embodiment is used in a reception environment as illustrated in FIG. 11, the interference suppression processing may backfire due to a change in the reception status of the interference signals 210b-1 and 210b-2. That is, the interference signal 210b-1 has only a partial effect on a weighting factor generated from the received signals received during the no-signal period 202. Accordingly, when a weighting factor generated from the received signals received during the no-signal period 202, interference suppression processing performed by the wireless receiving device 100b may provide the received signals with a lower suppression amount in a period of reception of the interference signals 210b-1 and 210b-2 within the period of reception of the preamble signals 203-1 to 203-N. In contrast, interference suppression processing performed by the wireless receiving device 100b may provide the received signals with a higher suppression amount in a period of reception of the interference signal 210b-1 within the period of reception of the preamble signals 203-1 to 203-N.

To address that issue, the change-amount measurement unit 109 of the wireless receiving device 100b measures an amount of change in each of the characteristic values of the received signals measured by the signal measurement unit 102. The change-amount measurement unit 109 converts each of the characteristic values obtained from the signal measurement unit 102, into a value of received power. If the received power has changed, for example, by an amount of a predetermined threshold or more, then, the change-amount measurement unit 109 determines that the reception status of the received signals has changed in the wireless receiving device 100b. As used herein, the phrase "the reception status has changed" means that, in the wireless receiving device 100b, the number of signals received has decreased, or the number of signals received has increased. The signals checked for determination of an increase or decrease in the number of signals received include not only the interference signals 210b-1 and 210b-2 illustrated in FIG. 11, but also the desired signal 200. Upon determining that the receiving situation of the received signals has changed, the change-amount measurement unit 109 informs the arrival determination unit 107b that the reception status of the received signals has changed. Upon determining that the reception status of the received signals does not change, the change-amount measurement unit 109 may inform the arrival determination unit 107b that the reception status of the received signals does not change.

On the basis of the notification from the change-amount measurement unit 109, the arrival determination unit 107b determines whether to use the arrival detection results from the arrival detection units 106-1 to 106-K based on the received signals that have been subjected to the interference suppression processing. For example, upon receiving the notification from the change-amount measurement unit 109 that the reception status of the received signals has changed, the arrival determination unit 107b uses the detection result output by the arrival detection unit 106b, at a time the arrival detection units 106-1 to 106-K would detect arrival of the desired signal on the basis of received signals on which the interference suppression units 105-1 to 105-K performed the interference suppression processing, using a weighting factor reflecting information of a changed symbol. The arrival detection unit 106b detects the arrival, using received signals that have not been subjected to the interference suppression processing.

This enables the wireless receiving device 100b to provide weighted interference suppression processing on an arriving signal, and also address an issue of sudden arrival or sudden disappearance of an interference signal.

Figure 12:
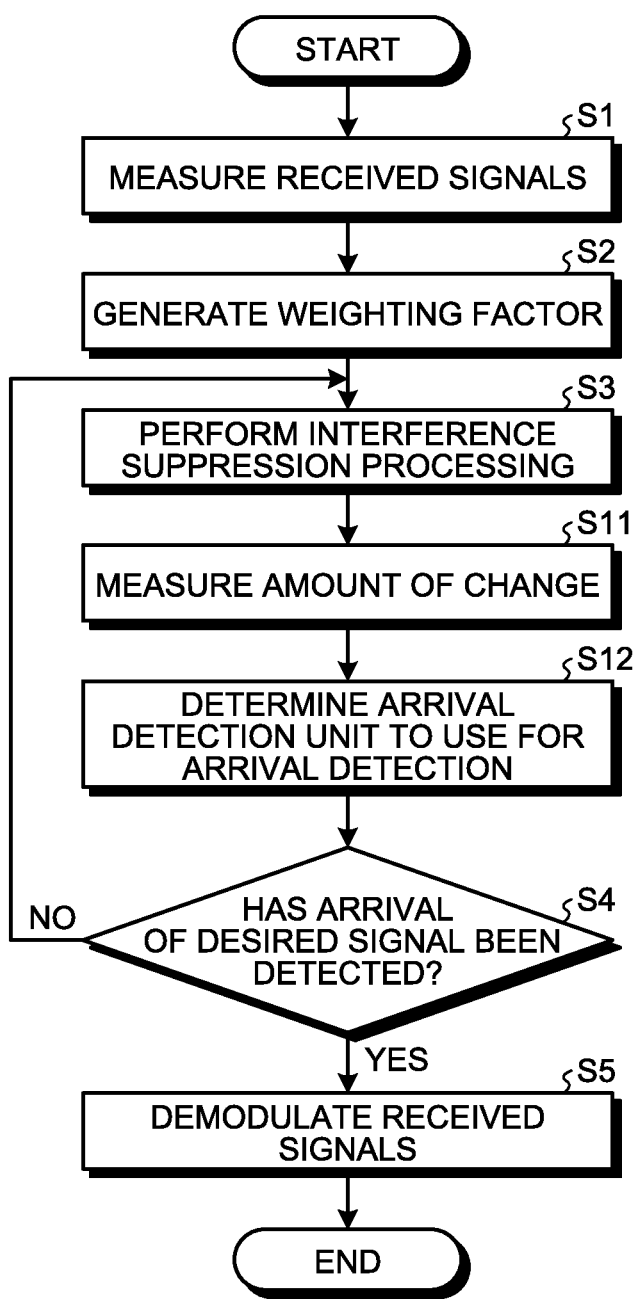
FIG. 12 is a flowchart illustrating a process of detection of arrival of a desired signal performed in the wireless receiving device according to the third embodiment.

FIG. 12 is a flowchart illustrating a process of detection of arrival of the desired signal 200 in the wireless receiving device 100b according to the third embodiment. The process from step S1 to step S3 is similar to the corresponding process of the first and second embodiments.

In the wireless receiving device 100b, the change-amount measurement unit 109 measures an amount of change in each of the characteristic values of the received signals measured by the signal measurement unit 102 (step S11). The change-amount measurement unit 109 informs the arrival determination unit 107b of whether the reception status of the received signals has changed. On the basis of the notification from the change-amount measurement unit 109, the arrival determination unit 107b determines the arrival detection unit of which the detection result should be used: the arrival determination unit 107b determines which arrival detection unit should be used for detection of the arrival (step S12). As described above, when receiving notification from the change-amount measurement unit 109 that the reception status of the received signals has changed, the arrival determination unit 107b determines to use the arrival detection unit 106b that detects the arrival, using received signals that have not been subjected to the interference suppression processing. When receiving notification from the change-amount measurement unit 109 that the reception status of the received signals has not changed, in contrast, the arrival determination unit 107b determines to use the arrival detection units 106-1 to 106-K that detect the arrival, using received signals that have been subjected to the interference suppression processing.

The subsequent process from step S4 to step S5 is similar to the corresponding process of the first and second embodiments. Although the flowchart of FIG. 12 illustrates the wireless receiving device 100b as performing steps S11 and S12 after step S3, the wireless receiving device 100b may perform steps S11 and S12 in parallel with steps S2 and S3.

The wireless receiving device 100b is implemented using hardware elements similar to the hardware elements of the first embodiment illustrated in FIG. 6 or 7.

As described above, according to the present embodiment, the wireless receiving device 100b is configured to determine whether a change has occurred in the reception status of the received signals. When a change has occurred in the reception status, the processing for detecting the arrival of a desired signal does not use received signals that have been subjected to interference suppression processing using a weighting factor generated using the measurement results obtained when the change in the reception status occurs. This enables the wireless receiving device 100b to provide weighted interference suppression processing on an arriving signal, and also address an issue of sudden arrival or sudden disappearance of an interference signal.

Fourth Embodiment

A fourth embodiment will be described below on the assumption that the known preamble signals contained in a desired signal are each a multi-carrier signal, e.g., an orthogonal frequency division multiplexing (OFDM) signal, under a reception environment similar to the reception environment of the second embodiment. The fourth embodiment differs from the second embodiment in the respect as will be described below.

Figure 13:
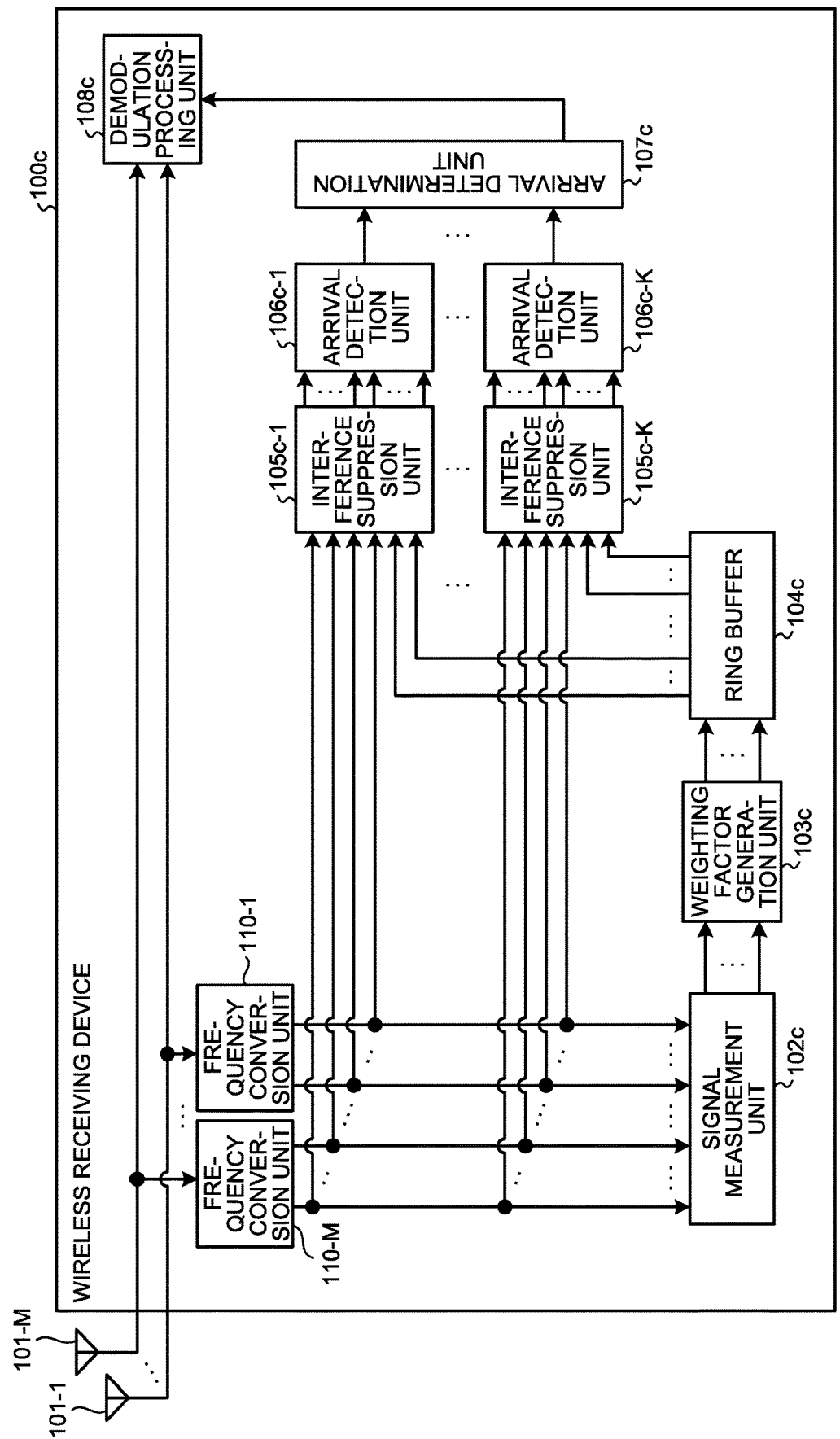
FIG. 13 is a block diagram illustrating an example configuration of a wireless receiving device according to a fourth embodiment.

FIG. 13 is a block diagram illustrating an example configuration of a wireless receiving device 100c according to the fourth embodiment. Note that FIG. 13 illustrates only the necessary components for the description of the fourth embodiment, and omits general components. The wireless receiving device 100c includes the reception antennas 101-1 to 101-M, frequency conversion units 110-1 to 110-M, a signal measurement unit 102c, a weighting factor generation unit 103c, a ring buffer 104c, interference suppression units 105c-1 to 105c-K, arrival detection units 106c-1 to 106c-K, an arrival determination unit 107c, and a demodulation processing unit 108c.

The frequency conversion units 110-1 to 110-M may be hereinafter referred to as "frequency conversion unit 110" if the frequency conversion units 110-1 to 110-M need not be individually referred to. The interference suppression units 105c-1 to 105c-K may be hereinafter referred to as "interference suppression unit 105c" if the interference suppression units 105c-1 to 105c-K need not be individually referred to. The arrival detection units 106c-1 to 106c-K may be hereinafter referred to as "arrival detection unit 106c" if the arrival detection units 106c-1 to 106c-K need not be individually referred to.

The frequency conversion units 110-1 to 110-M are connected one-to-one to the reception antennas 101-1 to 101-M, such that each frequency conversion unit 101 converts a received signal in a time domain received by the corresponding reception antenna 101 connected thereto, into a received signal in a frequency domain.

The signal measurement unit 102c measures, on a per multi-carrier-signal basis, a characteristic value of each of the received signals in the frequency domain provided by the frequency conversion units 110-1 to 110-M. The signal measurement unit 102c measures the characteristic values for each multi-carrier signal in a similar manner to the signal measurement unit 102 of measuring the characteristic value of each of the received signals in the first embodiment and the like.

From the characteristic values measured by the signal measurement unit 102c on a per multi-carrier-signal basis, the weighting factor generation unit 103c calculates correlation values for the respective characteristic values. The weighting factor generation unit 103c then generates weighting factors on a per each multi-carrier-signal basis in order to suppress the received signals in the frequency domain provided by the frequency conversion units 110-1 to 110-M.

The ring buffer 104c sequentially stores the weighting factors generated by the weighting factor generation unit 103c on a per multi-carrier-signal basis.

The interference suppression units 105c-1 to 105c-K each use the weighting factor to thereby perform interference suppression processing, on a per multi-carrier-signal, on the received signals in the frequency domain provided by the frequency conversion units 110-1 to 110-M. The weighting factor for each multi carrier signal is generated on the basis of the received signals having been subjected to different frequency conversion processes, and stored in the ring buffer 104c.

The arrival detection units 106c-1 to 106c-K detect arrival of a desired signal from the wireless transmission device 300, using the received signals in the frequency domain that have been subjected to the interference suppression processing in the interference suppression units 105c-1 to 105c-K on a per multi-carrier-signal basis.

The arrival determination unit 107c determines whether the desired signal has been detected by the arrival detection units 106c-1 to 106c-K.

The demodulation processing unit 108c demodulates the desired signal received by the reception antennas 101-1 to 101-M when the arrival determination unit 107c determines that the desired signal has arrived.

The fourth embodiment is based on the assumption that the preamble signals are each a multi-carrier signal, e.g., an OFDM signal, in the same reception environment as the reception environment of FIG. 9 described for the second embodiment. In this case, the wireless receiving device 100c converts the received signals in the time domain into received signals in the frequency domain by the frequency conversion units 110-1 to 110-M, and performs processing, such as the measurement of the characteristic value measurement and the generation of the weighting factor, on the received signals in the frequency domain. In particular, the weighting factor generation unit 103c generates the weighting factors, in parallel, as many as the number of the multi-carrier signals, and stores these weighting factors in the ring buffer 104c. The ring buffer 104c includes, for each multi-carrier signal, the ring buffer 104a described in the second embodiment.

This enables the wireless receiving device 100c to provide weighted interference suppression processing by performing an operation similar to the operation of the second embodiment on a per multi-carrier-signal basis in a case where the preamble signals are each a multi-carrier signal.

Figure 14:
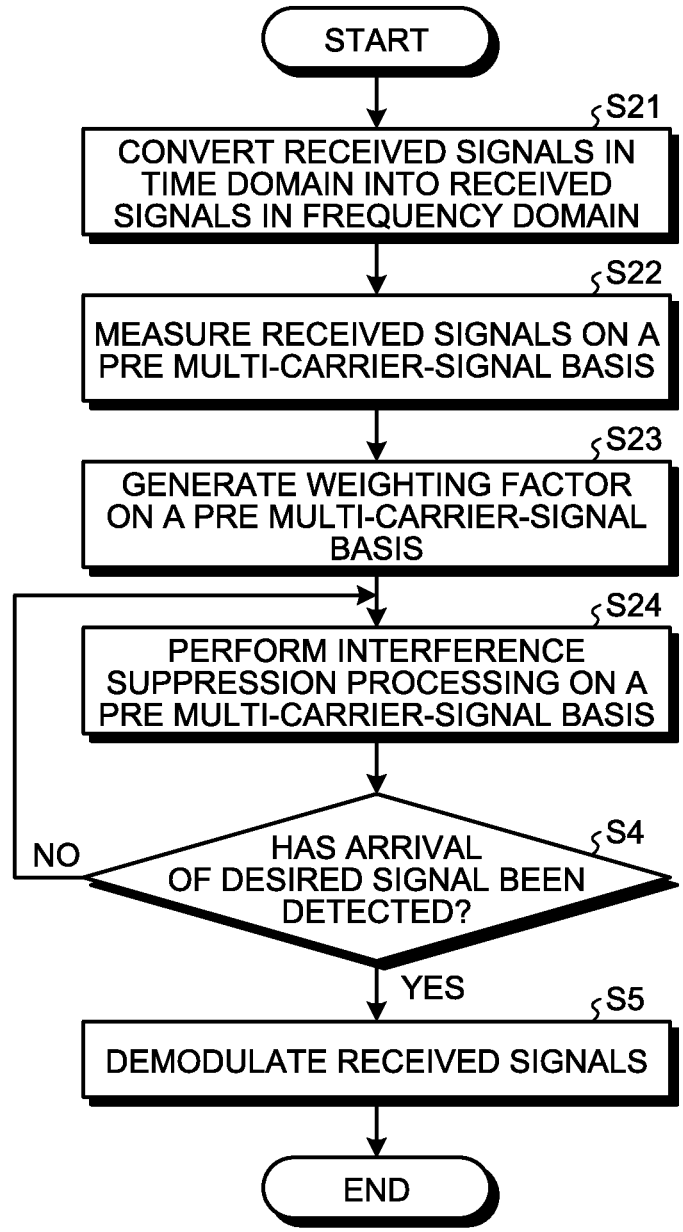
FIG. 14 is a flowchart illustrating a process of detection of arrival of a desired signal in the wireless receiving device according to the fourth embodiment.

FIG. 14 is a flowchart illustrating a process of detection of arrival of the desired signal 200 in the wireless receiving device 100c according to the fourth embodiment. At the beginning, in the wireless receiving device 100c, the frequency conversion units 110-1 to 110-M convert the received signals in the time domain received by the reception antennas 101-1 to 101-M into received signals in the frequency domain (step S21).

The signal measurement unit 102c measures the received signals. Specifically, the signal measurement unit 102c measures, on a per multi-carrier-signal basis, characteristic values of the received signals in the frequency domain provided by the frequency conversion units 110-1 to 110-M (step S22).

The weighting factor generation unit 103c uses the characteristic values measured on a per multi-carrier-signal basis by the signal measurement unit 102c, thereby generating a weighting factor for each multi-carrier signal (step S23). The interference suppression units 105c-1 to 105c-K each uses the weighting factor for each multi-carrier signal to thereby perform interference suppression processing on the received signals in the frequency domain on a per multi-carrier-signal basis (step S24). The used weighting factor for each multi-carrier signal is generated by the weighting factor generation unit 103c and stored in the ring buffer 104c. The arrival detection units 106c-1 to 106c-K attempt to detect arrival of a desired signal on the basis of the received signals that have been subjected to the interference suppression processing in the interference suppression units 105c-1 to 105c-K (step S4). The subsequent process from step S4 to step S5 is similar to the corresponding process of the second embodiment and the like.

The wireless receiving device 100c is implemented using hardware elements similar to the hardware elements of the first embodiment illustrated in FIG. 6 or 7.

As described above, according to the present embodiment, where the preamble signals contained in the desired signal are each a multi-carrier signal, the wireless receiving device 100c generates a weighting factor, on a per multi-carrier-signal basis, using results of measurement of the respective received signals, and performs the interference suppression processing and the processing for detection of arrival of a desired signal on a per multi-carrier-signal basis. This enables the wireless receiving device 100c to provide weighted interference suppression processing on an arriving signal by performing an operation similar to the operation of the second embodiment on a per multi-carrier-signal basis in a case where the preamble signal are each a multi-carrier signal.

Fifth Embodiment

A fifth embodiment will be described below on the assumption that the preamble signals are each a multi-carrier signal, e.g., an OFDM signal, in a reception environment similar to the reception environment of the third embodiment. The fifth embodiment differs from the third and fourth embodiments in the respects as will be described below.

Figure 15:
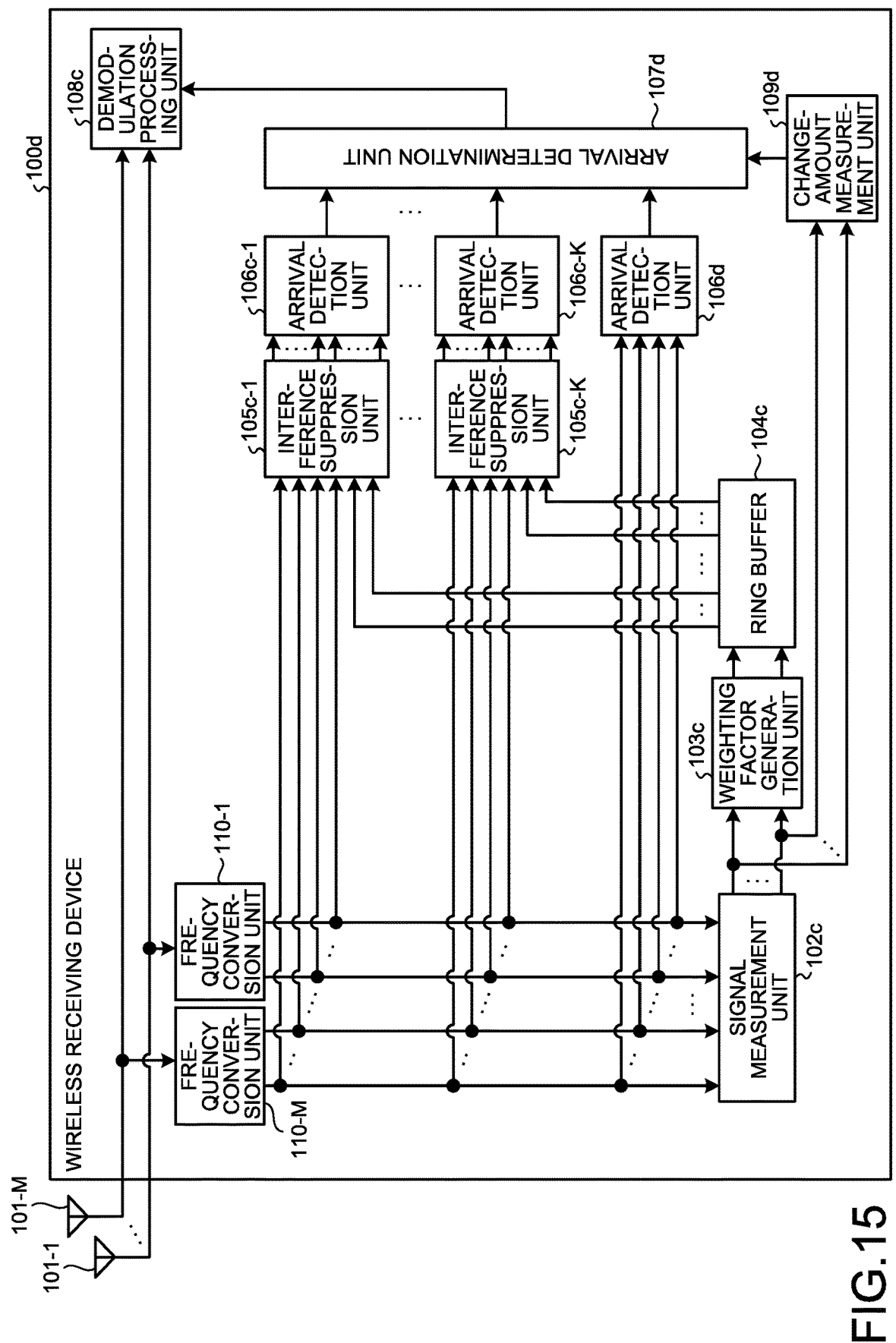
FIG. 15 is a block diagram illustrating an example configuration of a wireless receiving device according to a fifth embodiment.

FIG. 15 is a block diagram illustrating an example configuration of a wireless receiving device 100d according to the fifth embodiment. Note that FIG. 15 illustrates only the necessary components for the description of the fifth embodiment, and omits general components. As compared to the wireless receiving device 100c, the wireless receiving device 100d is configured such that the arrival determination unit 107c is replaced with an arrival determination unit 107d, and an arrival detection unit 106d and a change-amount measurement unit 109d are added.

The arrival detection unit 106d is connected to none of the interference suppression units 105c-1 to 105c-K. The arrival detection unit 106d to detect arrival of a desired signal, using received signals in a frequency domain provided by the frequency conversion unit 110-1 to 110-M but not subjected to interference suppression processing. The arrival detection unit 106d operates similarly to the arrival detection unit 106c-1 described above and the like. As used herein, the arrival detection units 106c-1 to 106c-K are collectively referred to as "first arrival detection units", and the arrival detection unit 106d is referred to as "second arrival detection unit".

The change-amount measurement unit 109d measures an amount of change in each of the measurement results, i.e., the characteristic values for each multi-carrier signal, measured by the signal measurement unit 102c. Specifically, the change-amount measurement unit 109d converts each of the characteristic values for each multi-carrier signal output from the signal measurement unit 102c into a value of received power, and measures the amount of change in the received power. On the basis of the measured amount of change, the change-amount measurement unit 109d determines whether a change has occurred in a reception status of the received signals in the wireless receiving device 100d.

The arrival determination unit 107d is connectable to the K+1 arrival detection units 106c-1 to 106c-K and 106d, and determines whether the arrival detection units 106c-1 to 106c-K and/or 106d have detected a desired signal. On the basis of the determination made by the change-amount measurement unit 109d, the arrival determination unit 107d determines to use either the detection results from the arrival detection units 106c-1 to 106c-K or the detection result from the arrival detection unit 106d.

The fifth embodiment is based on the assumption that the preamble signals are each a multi-carrier signal, e.g., an OFDM signal, in the same reception environment as the reception environment of FIG. 11 described for the third embodiment. In this case, in the wireless receiving device 100*d*, the change-amount measurement unit 109*d* is added unlike the wireless receiving device 100*c* of the fourth embodiment illustrated in FIG. 13. The change-amount measurement unit 109*d* measures the amount of change in each of the characteristic values for each multi-carrier signal, the characteristic values being output from the signal measurement unit 102*c*. The change-amount measurement unit 109*d* then determines whether the reception status of the received signals has changed. On the basis of the notification from the change-amount measurement unit 109*d*, the arrival determination unit 107*d* determines to use either the detection results which the arrival detection units 106*c*-1 to 106*c*-K derive from the received signals that have been subjected to the interference suppression processing, or the detection result which the arrival detection unit 106*d* derives from the received signals that have not been subjected to the interference suppression processing.

This enables the wireless receiving device 100*d* to provide weighted interference suppression processing on an arriving signal, and also address an issue of sudden arrival or sudden disappearance of an interference signal by performing an operation similar to the operation of the third embodiment on a per multi-carrier-signal basis in a case where the preamble signals are each a multi-carrier signal.

Figure 16:
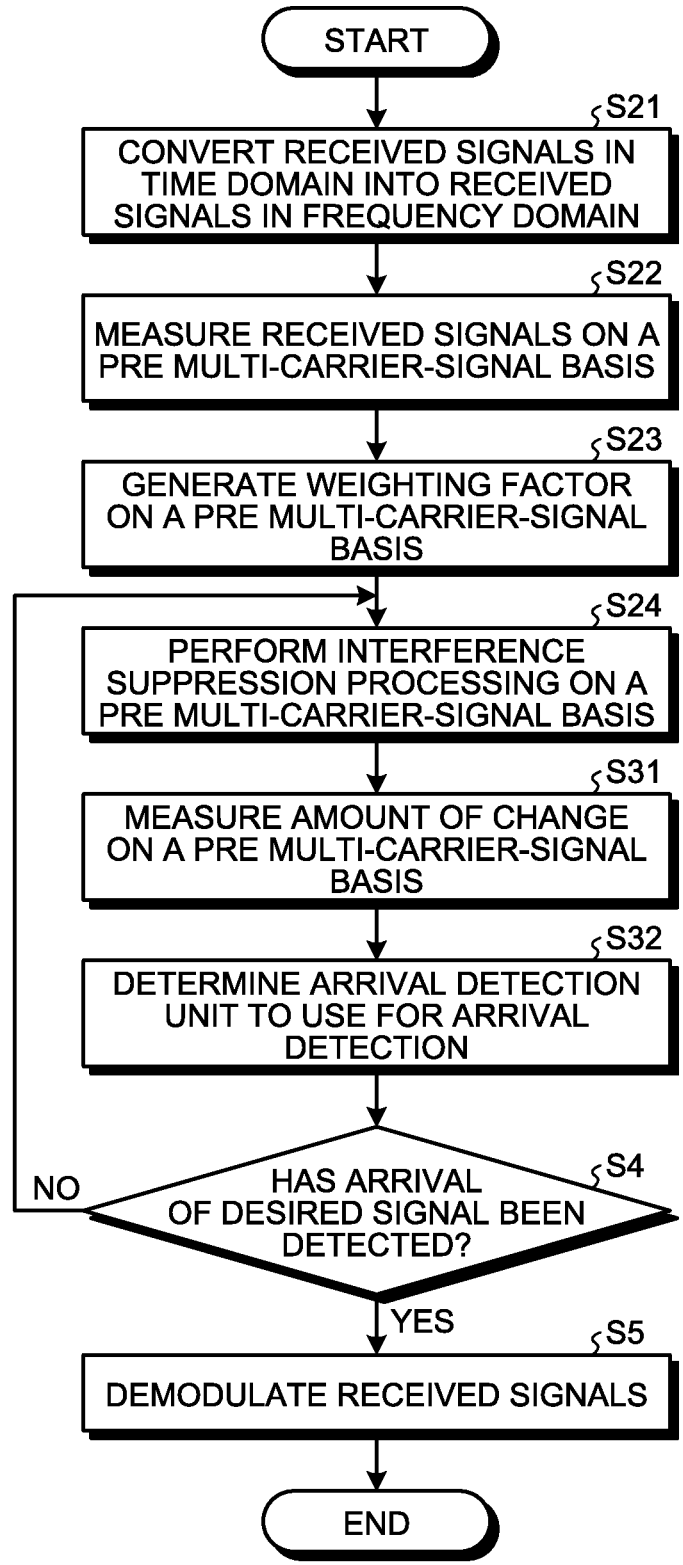
FIG. 16 is a flowchart illustrating a process of detection of arrival of a desired signal performed in the wireless receiving device according to the fifth embodiment.

FIG. 16 is a flowchart illustrating a process of detection of arrival of the desired signal 200 in the wireless receiving device 100*d* according to the fifth embodiment. The process from step S21 to step S24 is similar to the corresponding process of the fourth embodiment.

In the wireless receiving device 100*d*, the change-amount measurement unit 109*d* measures an amount of change in each of the characteristic values of the received signals measured by the signal measurement unit 102*c* on a per multi-carrier-signal basis (step S31). The change-amount measurement unit 109*d* informs the arrival determination unit 107*d* of whether the reception status of the received signals has changed. On the basis of the notification from the change-amount measurement unit 109*d*, the arrival determination unit 107*d* determines the arrival detection unit for use in detecting the arrival (step S32). As described above, upon receiving notification from the change-amount measurement unit 109*d* that the reception status of the received signals has changed, the arrival determination unit 107*d* determines to use the arrival detection unit 106*d* that detects the arrival, using received signals that have not been subjected to the interference suppression processing. Upon receiving notification from the change-amount measurement unit 109*d* that the reception status of the received signals does not change, in contrast, the arrival determination unit 107*d* determines to use the arrival detection units 106*c*-1 to 106*c*-K that detect the arrival, using received signals that have been subjected to the interference suppression processing.

The subsequent process from step S4 to step S5 is similar to the corresponding process of the third embodiment. Although the flowchart of FIG. 16 illustrates the wireless receiving device 100*d* as performing steps S31 and S32 after step S24, the wireless receiving device 100*d* may perform steps S31 and S32 in parallel with steps S23 and S24.

The wireless receiving device 100*d* is implemented using hardware elements similar to the hardware elements of the first embodiment illustrated in FIG. 6 or 7.

As described above, according to the present embodiment, where the preamble signals contained in the desired signal are each a multi-carrier signal, the wireless receiving device 100*d* generates a weighting factor, using results of measurement of the respective received signals on a per multi-carrier-signal basis, and performs the interference suppression processing and the processing for detection of the desired signal, on a per multi-carrier-signal basis. This enables the wireless receiving device 100*d* to provide weighted interference suppression processing on an arriving signal, and also address an issue of sudden arrival or sudden disappearance of an interference signal by performing an operation similar to the operation of the third embodiment on a per multi-carrier-signal basis in a case where the preamble signals are each a multi-carrier signal.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

100, 100*a*, 100*b*, 100*c*, 100*d* wireless receiving device; 101-1 to 101-M reception antenna; 102, 102*c* signal measurement unit; 103, 103*c* weighting factor generation unit; 104, 104*a*, 104*c* ring buffer; 105-1 to 105-K, 105*c*-1 to 105*c*-K interference suppression unit; 106-1 to 106-K, 106*b*, 106*c*-1 to 106*c*-K, 106*d* arrival detection unit; 107, 107*a*, 107*b*, 107*c*, 107*d* arrival determination unit; 108, 108*c* demodulation processing unit; 109, 109*d* change-amount measurement unit; 110-1 to 110-M frequency conversion unit; 300, 400, 401 wireless transmission device; 500 wireless communication system.

The invention claimed is:
1. A wireless receiving device comprising:
 a signal measurer to measure received signals, the received signals being signals received by a plurality of reception antennas;
 a weighting factor generator to generate weighting factors each for suppression of the received signals, on a basis of measurement results of the received signals, the measurement results being provided by the signal measurer;
 a plurality of interference suppressors each to perform, in a parallel manner, interference suppression processing on the received signals, using one of the weighting factors, the one weighting factor used by one of the interference suppressors being different from weighting factors used by other interference suppressors, the weighting factors being generated by the weighting factor generator at different points of time;
 a plurality of arrival detectors connected one-to-one to the plurality of interference suppressors, each of the arrival detectors detecting arrival of a desired signal using the received signals that have been subjected to the interference suppression processing in the corresponding interference suppressor connected thereto;
 an arrival determiner to determine whether the desired signal has arrived, on the basis of detection results provided by the plurality of arrival detectors; and
 a demodulation processor to demodulate the received signals received by the plurality of reception antennas, when the arrival determiner determines that the desired signal has arrived.

2. The wireless receiving device according to claim 1, wherein
 the plurality of interference suppressors each perform the interference suppression processing, using a same weighting factor, on the received signals having symbols identical in number to symbols of known preamble signals contained in the desired signal, such that each of the plurality of interference suppressors that has used the same weighting factor performs the interference suppression processing on all of the symbols of the preamble signals, the same weighting factor being based on measurement results of the received signals in a no-signal period lacking the desired signal, the no-signal period being prior to arrival of the desired signal.

3. The wireless receiving device according to claim 2, wherein the plurality of interference suppressors individually perform, in a parallel manner, the interference suppression processing on the received signals amounting to the number of symbols of the preamble signals, over different ranges of the interference suppression processing that are shifted from one another by one symbol length of the preamble signals, and of the plurality of arrival detectors, an arrival detector connected to each interference suppressor that performs the interference suppression processing on all of the symbols of the preamble signals detects the arrival of the desired signal.

4. The wireless receiving device according to claim 1, wherein the plurality of arrival detectors are first arrival detectors, and further comprising:

a second arrival detector connected to none of the plurality of interference suppressors, the second arrival detector detecting arrival of a second desired signal, using the received signals received by the plurality of reception antennas; and a change-amount measurer to measure an amount of change in each of the measurement results provided by the signal measurer, the change-amount measurer determining whether a change has occurred in a reception status of the received signals, wherein on the basis of the determination made by the change-amount measurer, the arrival determiner determines to use either detection results from the first arrival detectors or a detection result from the second arrival detector.

5. The wireless receiving device according to claim 1, wherein known preamble signals contained in the desired signal are each a multi-carrier signal, and the received signals received by the plurality of reception antennas are signals in a time domain, and further comprising frequency converters to convert the received signals in the time domain into received signals in a frequency domain, wherein the signal measurer measures the received signals in the frequency domain provided by the frequency converters on a per multi-carrier-signal basis, the weighting factor generator generates the weighting factors on a per multi-carrier-signal basis, the plurality of interference suppressors individually perform, in a parallel manner, the interference suppression processing on the received signals in the frequency domain on a per multi-carrier-signal basis, using a weighting factor generated on a per multi-carrier-signal basis, and the plurality of arrival detectors detect the arrival of the desired signal, using received signals in the frequency domain that have been subjected to the interference suppression processing on a per multi-carrier-signal basis.

6. The wireless receiving device according to claim 5, wherein the plurality of arrival detectors are first arrival detectors, and further comprising:

a second arrival detector connected to none of the plurality of interference suppressors, the second arrival detector detecting arrival of a second desired signal, using the received signals in the frequency domain provided by the frequency converters; and a change-amount measurer to measure an amount of change in each of the measurement results provided by the signal measurer, wherein on the basis of the amount of change measured by the change-amount measurer, the arrival determiner determines to use either detection results from the first arrival detectors or a detection result from the second arrival detector.

7. The wireless receiving device according to claim 2, wherein the plurality of arrival detectors are first arrival detectors, and further comprising:

a second arrival detector connected to none of the plurality of interference suppressors, the second arrival detector detecting arrival of a second desired signal, using the received signals received by the plurality of reception antennas; and a change-amount measurer to measure an amount of change in each of the measurement results provided by the signal measurer, the change-amount measurer determining whether a change has occurred in a reception status of the received signals, wherein on the basis of the determination made by the change-amount measurer, the arrival determiner determines to use either detection results from the first arrival detectors or a detection result from the second arrival detector.

8. The wireless receiving device according to claim 3, wherein the plurality of arrival detectors are first arrival detectors, and further comprising:

a second arrival detector connected to none of the plurality of interference suppressors, the second arrival detector detecting arrival of a second desired signal, using the received signals received by the plurality of reception antennas; and a change-amount measurer to measure an amount of change in each of the measurement results provided by the signal measurer, the change-amount measurer determining whether a change has occurred in a reception status of the received signals, wherein on the basis of the determination made by the change-amount measurer, the arrival determiner determines to use either detection results from the first arrival detectors or a detection result from the second arrival detector.

9. The wireless receiving device according to claim 2, wherein known preamble signals contained in the desired signal are each a multi-carrier signal, and the received signals received by the plurality of reception antennas are signals in a time domain, and further comprising frequency converters to convert the received signals in the time domain into received signals in a frequency domain, wherein the signal measurer measures the received signals in the frequency domain provided by the frequency converters on a per multi-carrier-signal basis, the weighting factor generator generates the weighting factors on a per multi-carrier-signal basis, the plurality of interference suppressors individually perform, in a parallel manner, the interference suppression processing on the received signals in the frequency domain on a per multi-carrier-signal basis, using a weighting factor generated on a per multi-carrier-signal basis, and the plurality of arrival detectors detect the arrival of the desired signal, using received signals in the frequency domain that have been subjected to the interference suppression processing on a per multi-carrier-signal basis.

10. The wireless receiving device according to claim 3, wherein known preamble signals contained in the desired signal are each a multi-carrier signal, and the received signals received by the plurality of reception antennas are signals in a time domain, and further comprising frequency converters to convert the received signals in the time domain into received signals in a frequency domain, wherein the signal measurer measures the received signals in the frequency domain provided by the frequency converters on a per multi-carrier-signal basis, the weighting factor generator generates the weighting factors on a per multi-carrier-signal basis, the plurality of interference suppressors individually perform, in a parallel manner, the interference suppression processing on the received signals in the frequency domain on a per multi-carrier-signal basis, using a weighting factor generated on a per multi-carrier-signal basis, and the plurality of arrival detectors detect the arrival of the desired signal, using received signals in the frequency domain that have been subjected to the interference suppression processing on a per multi-carrier-signal basis.

11. A desired signal detection method comprising:

measuring received signals, the received signals being signals received by a plurality of reception antennas;

generating weighting factors each for suppression of the received signals, on a basis of measurement results of the received signals;

parallelly performing interference suppression processing on the received signals, using one of the weighting factors, the weighting factors being generated at different points of time;

detecting arrival of a desired signal, using received signals that have been subjected to the interference suppression processing;

determining whether the desired signal has arrived, on the basis of results of the detection; and demodulating the received signals received by the plurality of reception antennas when it is determined that the desired signal has arrived.

* * * * *